Aug. 14, 1945.  M. W. SEYMOUR ET AL  2,382,671
DIRECT METHOD OF PRODUCING COLOR PICTURES
Filed June 17, 1942
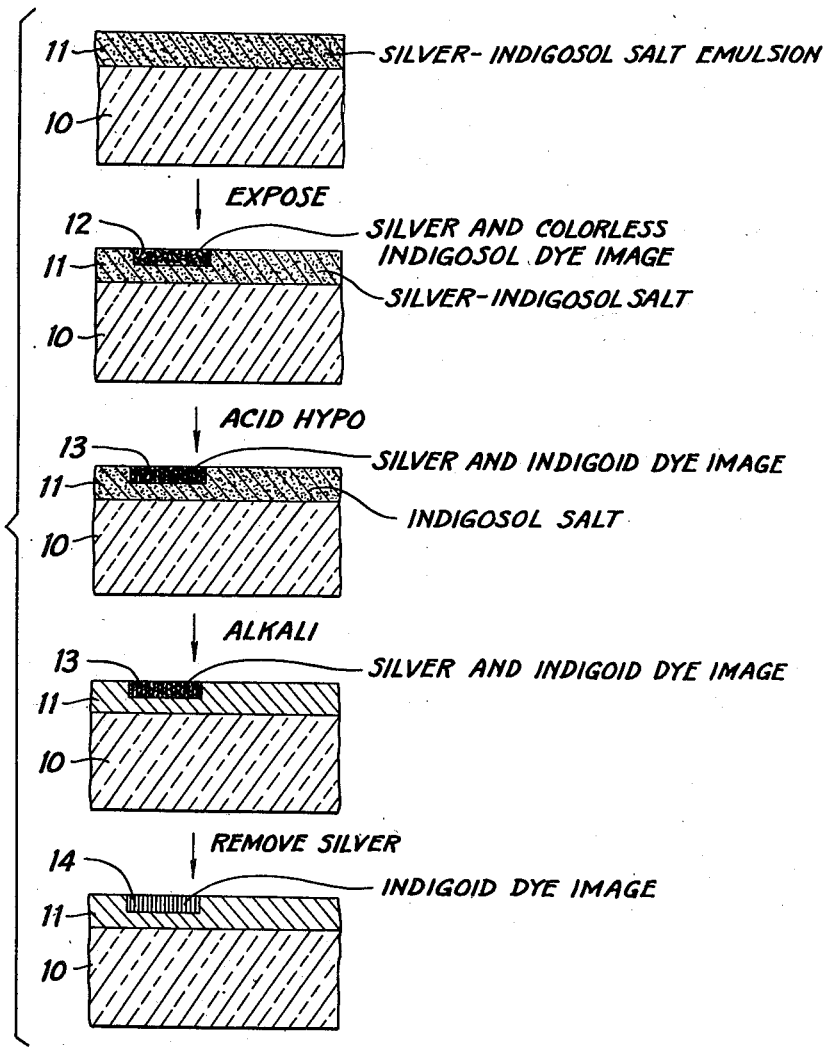
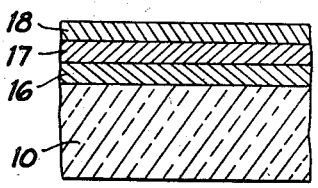
MERRILL W. SEYMOUR
RICHARD V. YOUNG
INVENTORS
BY
ATTORNEYS Patented Aug. 14, 1945

2,382,671

UNITED STATES PATENT OFFICE 2,382,671

DIRECT METHOD OF PRODUCING COLOR PICTURES

Merrill W. Seymour and Richard V. Young, Rochester, N. Y., assignors to Eastman Kodak Company, Rochester, N. Y., a corporation of New Jersey Application June 17, 1942, Serial No. 447,314

2 Claims. (Cl. 95—88)

This invention relates to a method in photography for forming color pictures and particularly concerns a direct method for printing colored images.

Indigosol dyes have been used in sensitive silver halide emulsion layers to form picture images in color. These processes depend, in part, upon the oxidation of the Indigosol dye from a leuco state to a color form. Indigosol dyes are soluble salts of sulfuric acid half esters of the leuco bases of vat dyes.

To the best of our knowledge these dyes have never been used in the form of noble metal salts, such as the sensitive silver salts, for the formation of colored images in photographic processes.

We have found that it is possible to make an emulsion using the silver salts of dyes of the Indigosol type, in which color images can be formed in a direct manner.

In the accompanying drawing, the various stages of Fig. 1 illustrate the appearance of an enlarged cross-section of a film prepared and processed in the manner of our invention.

Fig. 2 of the accompanying drawing illustrates in enlarged cross-sectional view the appearance of a multilayer film prepared and processed in the manner of our invention.

Our invention will now be described with particular reference to the accompanying drawing.

In our method, we first prepare an emulsion containing a silver salt of an Indigosol dye. A typical emulsion may be prepared from the following constituents:

Solution A

| | |
|---|---|
| Indigosol 0 grams | 1.65 |
| Gelatin (25 per cent solution) cc | 20 |
| Water cc | 25 |

Solution B

| | |
|---|---|
| Silver nitrate gram | 1 |
| Water cc | 20 |

Solution B is added to Solution A with thorough mixing, and then a small amount of chrome alum is added as a hardener. It does not appear critical, within limits, whether the Indigosol dye or the silver nitrate which is used to form the silver salt, is present in excess. The emulsion is then coated on a suitable support such as a cellulose ester or paper support in a known manner yielding the film of the first stage of Fig. 1 wherein layer 10 is a cellulosic support carrying the emulsion layer 11 of the invention. The film is then exposed under an image to light from a carbon arc lamp. The silver-Indigosol salt emulsion layer 11 shown in the first stage of Fig. 1 of the drawing, now appears as shown in the second stage, containing the silver and a colorless form of a vat dye image 12, and the unexposed silver-Indigosol salt.

The exposed film is then bathed for about three to five minutes in an acid solution, such as 3 per cent hydrochloric acid, and then treated in a fixing bath followed by washing for a few minutes. If desired, the separate acid bath may be dispensed with and the exposed film treated immediately after exposure with an acid fixing solution. The film now appears as shown in the third stage of the drawing, and contains the silver and Indigoid dye image 13, and Indigosol salt in the remainder of layer 11. The above treatment with acid appears to transform the colorless form of a vat dye image 12 into the Indigoid form. The fixing solution used either following the acid treatment, or simultaneously therewith, appears to remove the silver ion from the unexposed silver-Indigosol salt, leaving an alkali soluble form of the Indigosol dye in the rest of the unexposed area of the layer.

The film is then bathed for about twenty minutes in an alkali solution, such as a 1 per cent solution of sodium hydroxide. This solution removes the Indigosol salt from the unexposed area of layer 11, without affecting image 13. The film now appears as shown in the fourth stage of Fig. 1, and contains in the emulsion layer 11 the silver and Indigoid dye image 13, the rest of the layer being clear.

The silver remaining in the image area 13 is now removed with an acid bichromate solution of the following composition:

| | |
|---|---|
| Potassium bichromate grams | 4 |
| Sulfuric acid cc | 4 |
| Water to liter | 1 |

This bleach solution is permitted to act for about four to six minutes. The processed film appears as shown in the fifth stage of Fig. 1 wherein emulsion layer 11 contains the Indigoid dye image 14.

An alternate procedure for treating the exposed element shown in the second stage of Fig. 1, consists in combining the acid treating bath with a solution capable of oxidizing the silver image in the exposed area of layer 11 to silver halide, and applying this bath immediately after exposure. The composition of a solution suitable for this purpose is given as follows:

| | |
|---|---|
| Cupric chloride, $CuCl_2.2H_2O$ grams | 100 |
| Hydrochloric acid, concentrated cc | 25 |
| Water to make liter | 1 |

After treatment with this solution an element corresponding to the one shown in the third stage of Fig. 1 would contain in the image area 13, silver halide instead of metallic silver, in addition to the Indigoid dye image. The remaining area of the layer contains silver-Indigosol salt which has not been exposed.

The film is then treated with a fixing solution which removes the silver halide from the image area and the silver associated with the Indigosol salt in the unexposed area. After treatment with alkali solution, the film at this point is identical in appearance to that shown in the fifth stage of Fig. 1 of the accompanying drawings, except that it may contain some metallic silver in the image area 14, in which case it may be removed with the above bichromate solution in the usual manner.

Dyes of the type which may be used in our invention are Indigosol O (Schultz 7th edition, No. 1303); Indigosol 06B, Schultz Ergänzungsband I, p. 108; Indigosolrot HR, Schultz, Ergänzunsband I, p. 109; Indigosolscharlach JB, Schultz, Ergänzungsband I, p. 109.

In the application of our invention to color processes wherein sensitive multilayer color films are used, silver salts of dyes of the above types may be incorporated into separate layers in the film and said layers may be sensitized to different regions of the visible spectrum. For instance, a color film such as that shown in Fig. 2 of the accompanying drawing, may contain in layer 16, a silver salt of a blue Indigosol dye sensitized for red light, in layer 17, a silver salt of a magenta Indigosol dye sensitized for green light, and in layer 18, a silver salt of a yellow Indigosol dye sensitized for blue light. A film of this type is processed in the manner of the invention as above-described.

Similarly, the differently sensitized layers may be coated on separate supports, and after formation of part images in the layers, transferred to a single support.

Since the emulsions made with silver salts of Indigosol dyes give positive images when printed out under negatives, and negatives images when printed out under positives, it is necessary to print from color separation negatives or from a color negative such as those on monopack films processed by color-forming development processes, if a color positive is desired in one step. A color negative may, however, be prepared by direct printing from a positive color transparency onto the silver-dye salt emulsions of the invention, and then using the color negative so obtained in printing the final color positive onto a similar material.

It is obvious that our invention is subject to variations other than those mentioned, therefore, it is to be understood that the disclosure herein is by way of example and that we consider as included in our invention all modifications and equivalents falling within the scope of the appended claims.

What we claim is:

1. The method of forming a colored image in a photographic gelatin layer containing a light sensitive silver salt of an ester of the leuco compound of a vat dye, which comprises exposing said layer to form an image of silver and a colorless form of a vat dye, treating said exposed layer with acid solution to convert said image of a colorless form of a vat dye to a colored form, treating the layer with a fixing solution and an alkali solution to remove unexposed silver-leuco vat dye ester salt, and removing any silver in the layer.

2. The method of forming a colored image in a photographic gelatin layer containing a light sensitive silver salt of an ester of a leuco compound of a vat dye, which comprises exposing said layer to form an image of silver and a colorless form of a vat dye, treating said exposed layer with acid fixing solution to convert said image of a colorless form of a vat dye to a colored form and to remove silver ion from the unexposed silver-leuco vat dye ester salt, treating the layer with alkaline solution to remove the dye salt in the unexposed portions of the layer, and removing any silver in the layer.

MERRILL W. SEYMOUR.
RICHARD V. YOUNG.